United States Patent
Brodie et al.

(10) Patent No.: US 9,077,878 B2
(45) Date of Patent: Jul. 7, 2015

(54) ALTERNATIVE LENS INSERTION METHODS AND ASSOCIATED FEATURES FOR CAMERA MODULES

(71) Applicants: Douglas Stuart Brodie, Los Gatos, CA (US); Terence N. Tam, San Francisco, CA (US)

(72) Inventors: Douglas Stuart Brodie, Los Gatos, CA (US); Terence N. Tam, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 13/631,574

(22) Filed: Sep. 28, 2012

(65) Prior Publication Data

US 2013/0271648 A1    Oct. 17, 2013

Related U.S. Application Data

(60) Provisional application No. 61/625,084, filed on Apr. 17, 2012.

(51) Int. Cl.
*H04N 5/225*    (2006.01)

(52) U.S. Cl.
CPC ......... *H04N 5/2254* (2013.01); *Y10T 29/49826* (2015.01); *Y10T 29/49812* (2015.01); *H04N 5/2257* (2013.01)

(58) Field of Classification Search
CPC .............................. H04N 5/2254; H04N 5/2257
See application file for complete search history.

(56) References Cited

U.S. PATENT DOCUMENTS

| 7,702,233 | B2 * | 4/2010 | Oh et al. .................. 396/133 |
| 2005/0048692 | A1 * | 3/2005 | Hanada et al. ............ 438/106 |
| 2009/0302205 | A9 * | 12/2009 | Olsen et al. .............. 250/226 |
| 2010/0205793 | A1 * | 8/2010 | Ko et al. ................. 29/281.5 |
| 2011/0002056 | A1 * | 1/2011 | Ko .......................... 359/823 |
| 2011/0075277 | A1 * | 3/2011 | Lee et al. ................ 359/819 |
| 2011/0228154 | A1 * | 9/2011 | Westerweck et al. ...... 348/311 |
| 2012/0025398 | A1 | 2/2012 | Jang et al. |
| 2012/0049338 | A1 | 3/2012 | Chen et al. |
| 2012/0068319 | A1 | 3/2012 | Choi et al. |
| 2012/0086003 | A1 * | 4/2012 | Park ......................... 257/48 |
| 2012/0307140 | A1 * | 12/2012 | Wang et al. .............. 348/374 |

* cited by examiner

*Primary Examiner* — Lin Ye
*Assistant Examiner* — John H Morehead, III
(74) *Attorney, Agent, or Firm* — Blakely, Sokoloff, Taylor & Zafman LLP

(57) ABSTRACT

A camera module has an image sensor and a lens assembly that includes a lens barrel having a first cylindrical portion that includes an externally threaded portion and a second cylindrical portion that has a larger diameter than the externally threaded portion. A lens moving mechanism includes a movable sleeve having internal threads that receive the externally threaded portion of the lens assembly. The lens moving mechanism is coupled to the image sensor such that the second cylindrical portion of the lens assembly is closest to the image sensor. The camera module is assembled by inserting the lens assembly into the lens moving mechanism from the side closest to the image sensor. An installation tool engages the second cylindrical portion to rotate the lens assembly and engage the externally threaded portion of the lens assembly with an internally threaded portion of a movable sleeve in the lens moving mechanism.

33 Claims, 4 Drawing Sheets

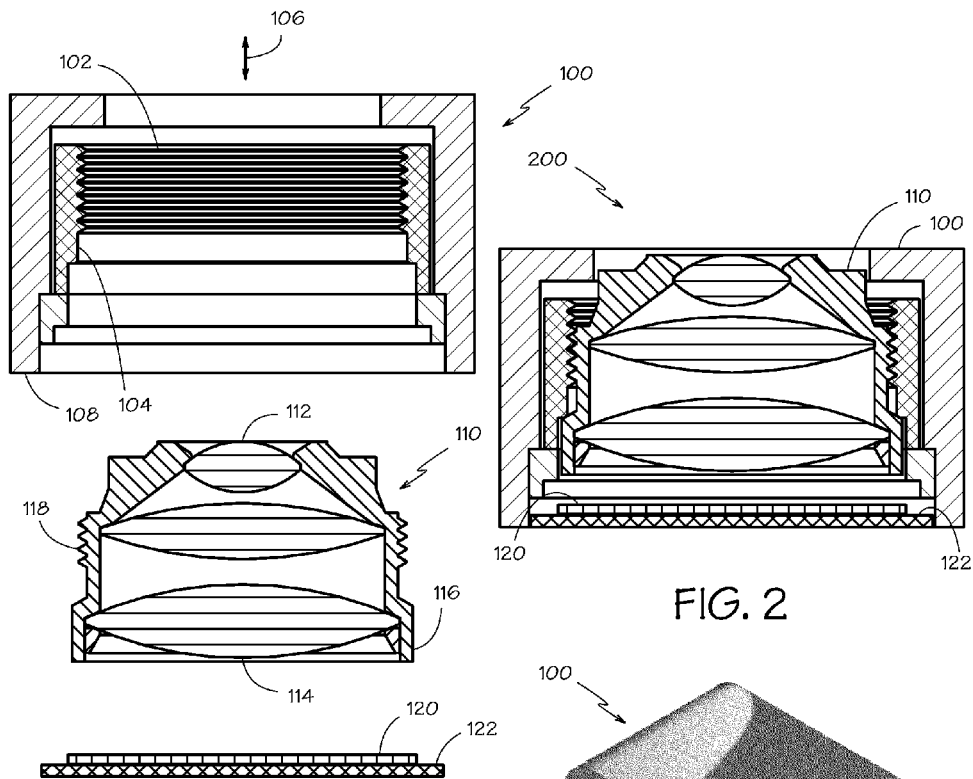
FIG. 1
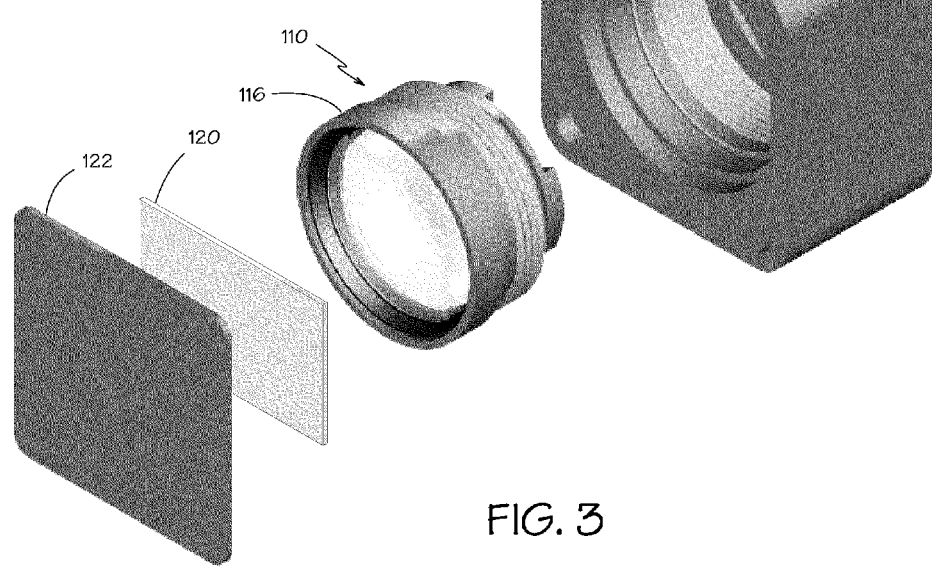
FIG. 2
FIG. 3

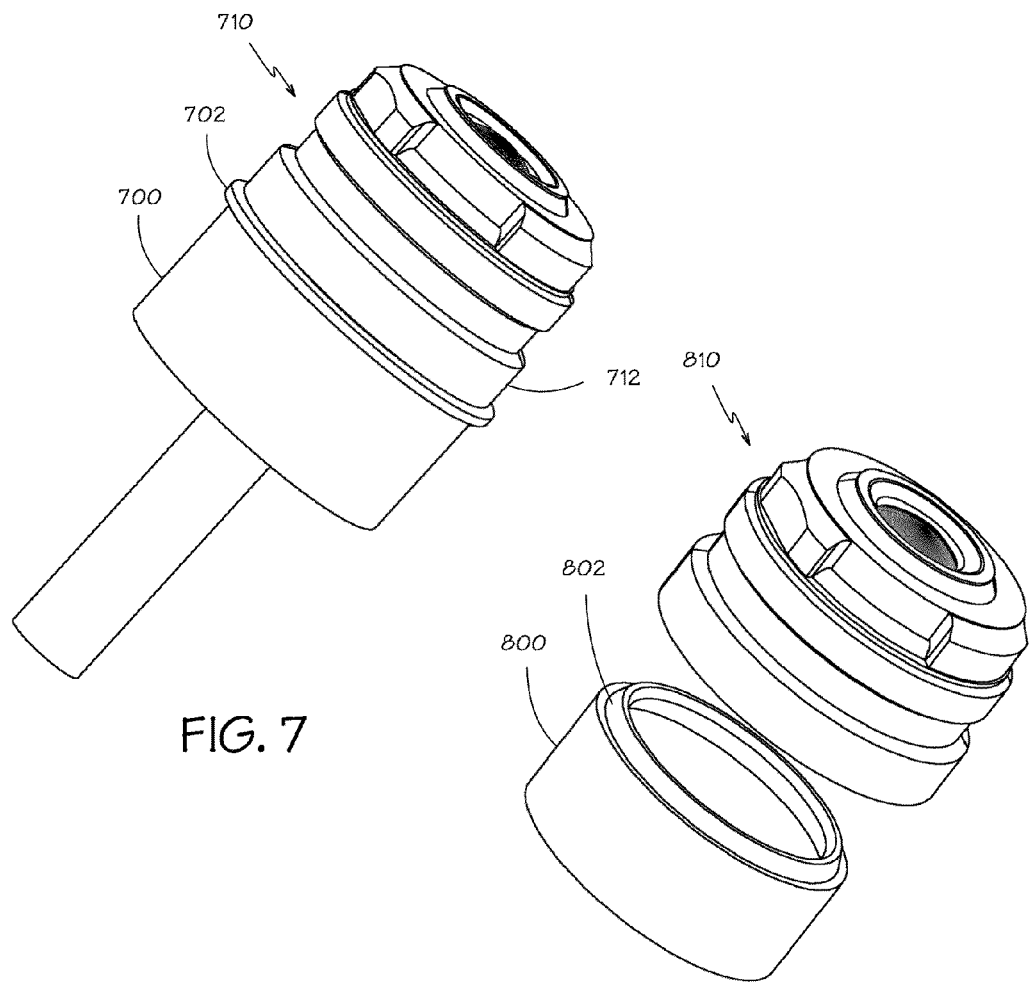
FIG. 7
FIG. 8
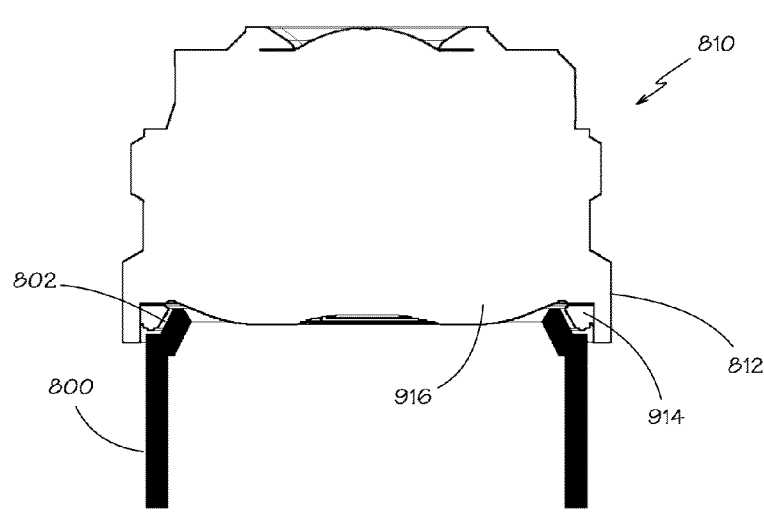
FIG. 9

ALTERNATIVE LENS INSERTION METHODS AND ASSOCIATED FEATURES FOR CAMERA MODULES

CROSS REFERENCE TO RELATED APPLICATIONS

This application claims the benefit pursuant to 35 U.S.C. 119(e) of U.S. Provisional Application No. 61/625,084, filed Apr. 17, 2012, which application is specifically incorporated herein, in its entirety, by reference.

BACKGROUND

1. Field

Embodiments of the invention relate to the field of camera lens modules; and more specifically, to a camera module for use in portable digital devices.

2. Background

Many portable electronic devices, such as mobile cellular telephones, include a digital camera. The lenses for such cameras must be compact to fit within the case of the portable electronic device. At the same time there is a desire to provide an increasingly high quality camera function in these devices. To provide a higher quality image, some cameras found in portable electronic devices provide an autofocus feature.

The lens may be mounted in a mechanism that moves the lens along its optical axis to change the distance between the lens and the image sensor. This changes the focal distance of the camera and allows a sharper image to be obtained for subjects over a greater range of distances from the camera. One such lens moving mechanism for moving a lens is a voice coil motor.

Typically the lens will be joined to the lens moving mechanism by screw threads. The assembly is difficult because the lens and the lens moving mechanism are fairly delicate and the assembly must be done without exerting excessive forces on the lens or the mechanism, either axially or rotationally. The small size of the parts further complicates the assembly. A typical lens used in a portable electronic device may have a diameter of about 0.25 inches (6.5 millimeters).

Typically a lens is inserted into a lens moving mechanism, such as a voice coil motor, and an image sensor is then assembled to the lens moving mechanism to provide a camera lens module. The module is assembled in clean room conditions so that dust is not trapped between the lens and the image sensor. The assembled camera lens module provides all the optical components in a single package that can be assembled into the portable electronic device.

It would be desirable to provide lens insertion methods and structures that allow the camera lens module to be reduced in size.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements:

FIG. 1 is a cross-sectional view of the components of a camera module in an unassembled configuration.

FIG. 2 is a cross-sectional view of the camera module of FIG. 1 in an assembled configuration.

FIG. 3 is a pictorial view of the camera module of FIG. 1 in an unassembled configuration.

FIG. 7 is a pictorial view of another lens assembly with another tool for assembling the lens assembly to the lens moving mechanism.

FIG. 8 is a pictorial view of another lens assembly with another tool for assembling the lens assembly to the lens moving mechanism.

FIG. 9 is a cross-sectional view of the tool of FIG. 8 engaging the lens assembly.

DETAILED DESCRIPTION

Figures 4A, 4B:
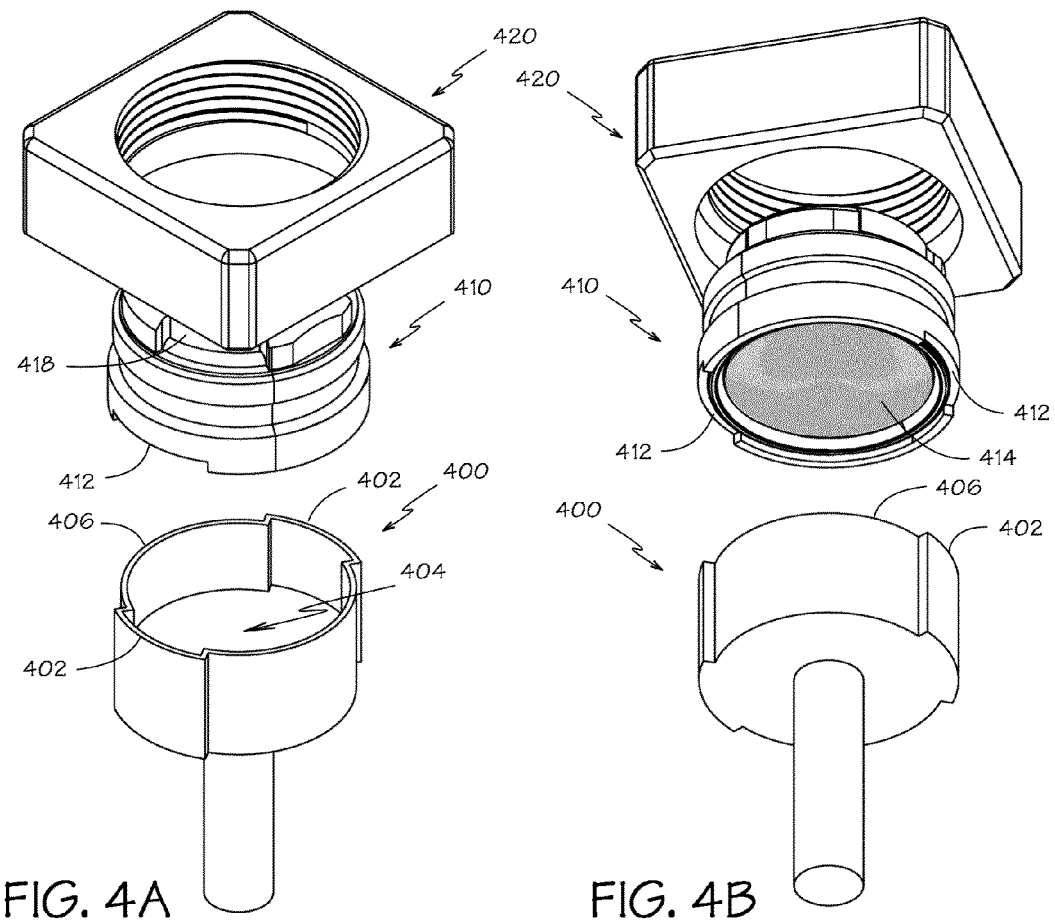
FIGS. 4A and 4B are pictorial views of another camera module in an unassembled configuration with a tool for assembling the lens assembly to the lens moving mechanism.

In the following description, numerous specific details are set forth. However, it is understood that embodiments of the invention may be practiced without these specific details. In other instances, well-known circuits, structures and techniques have not been shown in detail in order not to obscure the understanding of this description.

FIG. 1 is a cross-sectional view of the components of a camera module in an unassembled configuration. FIG. 2 is a cross-sectional view of the camera module 200 of FIG. 1 in an assembled configuration. FIG. 3 is a pictorial view of the camera module of FIG. 1 in an unassembled configuration.

The camera module shown in FIGS. 1-3 includes a lens moving mechanism 100, which may be a voice coil motor. The lens moving mechanism 100 includes a movable sleeve 104 having internal threads 102. The lens moving mechanism 100 provides means for moving the movable sleeve 104 axially in the direction shown by the two-headed arrow 106. A particular means for moving the movable sleeve 104 is not shown and any such means may be used.

The camera module further includes a lens assembly that includes two or more lenses 112, 114 mounted in a lens barrel 110. The lens barrel has a first cylindrical portion that includes an externally threaded portion 118 and a second cylindrical portion 116 that has a larger diameter than the externally threaded portion. This lens assembly differs from conventional lens assemblies in which the externally threaded portion has the largest diameter of any portion of the lens barrel.

The diameter of the second cylindrical portion 116 is selected to be just slightly larger than the largest diameter lens 114 in the lens assembly. This lens 114 will be the lens closest to an image sensor 120. Providing a second cylindrical portion 116 that has a larger diameter than the externally threaded portion 118 allows the lens moving mechanism 100 to be more compact because the internal threads 102 of the movable sleeve 104 do not have to have a diameter that can accommodate the second cylindrical portion 116. However this creates a difficulty in assembling the camera module 200.

Typically a lens assembly is assembled to a lens moving mechanism by inserting the lens assembly into the lens moving mechanism from the side furthest from the image sensor. This requires that the entire portion of lens barrel below the externally threaded portion, including the portion supporting the largest diameter lens, pass through the internally threaded portion of a movable sleeve in the lens moving mechanism toward the image sensor. This allows the lens barrel to be held at the end furthest from the image sensor, the end which supports the smallest lens and which may be referred to as the front end of the lens assembly.

It will be appreciated that while a lens assembly may be described a moving in relation to an image sensor during assembly, such description is merely to establish the direction within the components of the camera module and the image sensor will likely not be present in the camera module when the lens assembly is assembled to the lens moving mechanism. Thus a description of a lens assembly advancing toward an image sensor during assembly should be understood to include advancing toward the place where an image sensor would be positioned in a fully assembled camera module.

The smallest lens at the front end of the lens assembly is much smaller in diameter than the outer diameter of the lens barrel. This allows engagement features to be provided in the front end of the lens barrel. An assembly tool can easily engage the engagement features and assemble the lens assembly to the internally threaded portion of the movable sleeve with the lens assembly advancing toward the image sensor as it is threaded into the movable sleeve.

In embodiments of the invention, the second cylindrical portion 116 has a larger diameter than the externally threaded portion 118 of the lens barrel, and the corresponding internally threaded portion 102 of the movable sleeve 104. Therefore, a lens assembly 200 that embodies the invention cannot be assembled to the internally threaded portion 102 of the movable sleeve 104 with the lens assembly advancing toward the image sensor 120 as it is threaded into the movable sleeve. It is required that a lens assembly 200 that embodies the invention be assembled to the internally threaded portion 102 of the movable sleeve 104 with the lens assembly advancing away from the image sensor 120 as it is threaded into the movable sleeve. The lens assembly 200 must be assembled from the back side 108 of the lens moving mechanism 100, which is the side that will be closest to the image sensor 120. The image sensor 120 may be supported by a substrate 122 that is assembled to the lens moving mechanism 100 to complete the camera module 100.

Assembling the lens assembly 200 from the back side 108 of the lens moving mechanism 100 requires the lens barrel 110 to be held at the end 116 closest to the image sensor, the end which supports the largest lens 114 and which may be referred to as the back end of the lens assembly. At the back end 116 of the lens assembly 200, it is desirable to make the lens barrel 110 as small as possible to keep the camera module 100 compact. The back end 116 of the lens assembly 200 may have a diameter that is only 0.2 to 0.4 millimeters larger than the large lens 114 supported by the back end of the lens barrel. Thus the walls of the lens barrel 110 at the back end 116 may be only 0.1 to 0.2 millimeters. Further, the large lens 114 may need to approach to within 30 microns of an infrared cut filter (not shown) that is between the lens assembly 200 and the image sensor 120. Therefore thickest portion of the rear surface the large lens 114 must be approximately flush with the back end of the lens assembly 200. This configuration makes it difficult to hold the lens assembly 200 for assembly to the lens moving mechanism 100 from the back side 108.

A camera module that embodies the present invention may be assembled by inserting the lens assembly 110 into the lens moving mechanism 100 from the back side. The lens assembly 110 includes a lens barrel 110 having a first cylindrical portion that includes an externally threaded portion 118 and a second cylindrical portion 116 that has a larger diameter than the externally threaded portion. An installation tool is engaged with the second cylindrical portion 116 of the lens assembly 110. A portion of the installation tool that engages the lens assembly has a diameter no greater than the diameter of the second cylindrical portion 116 of the lens assembly 110. This permits the installation tool to pass through the back side of the lens moving mechanism 100 as necessary during the assembly process. The installation tool rotates the lens assembly 110 to engage the externally threaded portion 118 of the lens assembly 110 with the internally threaded portion 102 of the movable sleeve 104 of the lens moving mechanism 100. The lens assembly 110 advances away from the image sensor 120 as it is threaded into the movable sleeve 104. The image sensor 120 is coupled to the lens moving mechanism 100 such that the second cylindrical portion 116 of the lens assembly 110 is closest to the image sensor.

Figures 5, 6:
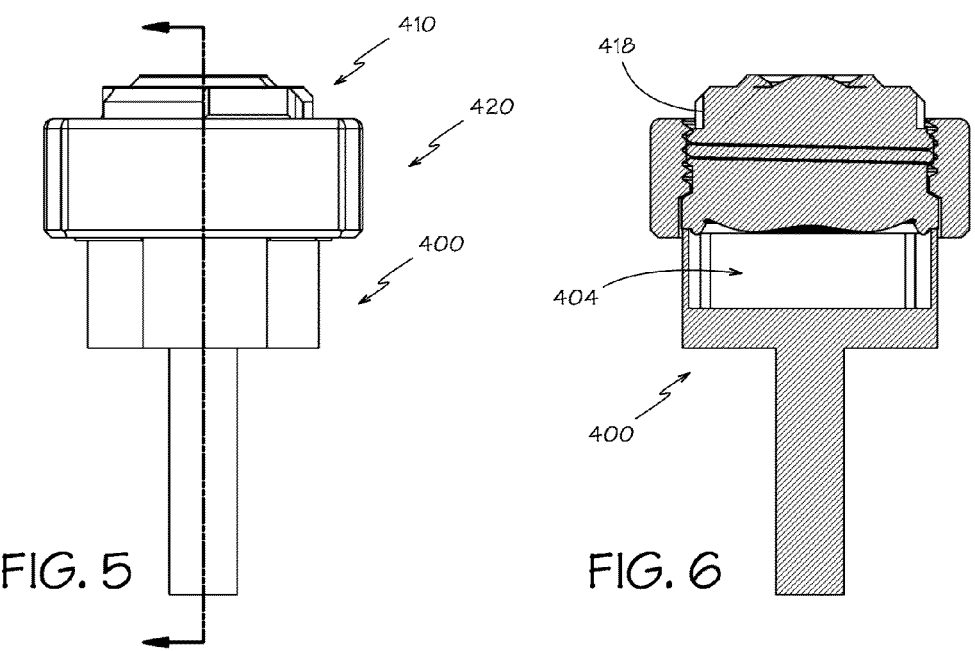
FIG. 5 is a side view of the camera module of FIGS. 4A and 4B in an assembled configuration with the tool for assembling the lens assembly to the lens moving mechanism.
FIG. 6 is a cross-sectional view of the camera module taken along section line 6-6 in FIG. 5.

FIGS. 4A and 4B are pictorial views of another camera module in an unassembled configuration with a tool 400 for assembling the lens assembly 410 to the lens moving mechanism 420. FIG. 5 is a side view of the camera module of FIGS. 4A and 4B in an assembled configuration with the tool 400 for assembling the lens assembly 410 to the lens moving mechanism 420. FIG. 6 is a cross-sectional view of the camera module taken along section line 6-6 in FIG. 5.

In this embodiment the tool 400 includes protrusions 402 that mechanically engage notches 412 provided in the second cylindrical portion 416 of the lens assembly 410 that is closest to the image sensor. A wall 406 of the tool 400 may fit the inside cylindrical surface to the lens assembly 410 adjacent the large lens 414 to provide support for the the lens assembly 410 during the assembly process. The center portion 404 of the tool 400 is recessed to provide clearance that prevents the tool from touching the surface of the large lens 414.

A vacuum may be used to hold the lens assembly 410 with the installation tool 400. For example, a vacuum may be applied in the center portion 404 of the tool 400.

The lens assembly 410 may include engagement features 418 at the front of the lens assembly. The engagement features 418 may be used to rotate the lens assembly 410 from the front side after the lens assembly 410 is initially engaged with the lens moving mechanism 420 from the back side.

FIG. 7 is a pictorial view of another lens assembly 710 with another tool 700 for assembling the lens assembly to a lens moving mechanism. In this embodiment, the tool has a flat surface 702 to engage the flat surface at the back of the second cylindrical portion 712 of the lens assembly 710.

In some embodiments, the surface of the installation tool that engages the second cylindrical portion 712 of the lens assembly 710 may be a material having a high coefficient of static friction with the lens barrel material. For example, the coefficient of static friction may be greater than 0.6.

In some embodiments, a temporary adhesive may join the second cylindrical portion 712 of the lens barrel to the installation tool 700. The lens barrel is separated from the installation tool 700 at the adhesive joint once the lens assembly 710 has been assembled.

FIG. 8 is a pictorial view of another lens assembly 810 with another tool 800 for assembling the lens assembly to the lens moving mechanism. This tool 800 includes a conical surface 802 that engages an inside surface of the second cylindrical portion 812 of the lens assembly 810. FIG. 9 is a cross-sectional view of the tool of FIG. 8 engaging the inside surface of the second cylindrical portion 812 of the lens assembly 800. The lens assembly 810 may provide a conical recess that the conical surface 802 of the installation tool presses against. A retaining ring 914 for the large lens 916 may provide the conical surface in the second cylindrical portion 812 of the lens assembly 800. The conical surface may be advantages in that a greater pressure can be applied normal to the gripping surfaces without exceeding the allowable axial force applied to the lens moving mechanism.

The conical surface 802 of the installation tool 800 may be a resilient material. The conical surface 802 of the installation tool 800 may be a material having a high coefficient of static friction with the lens barrel material. For example, the coefficient of static friction may be greater than 0.6.

Figure 10:
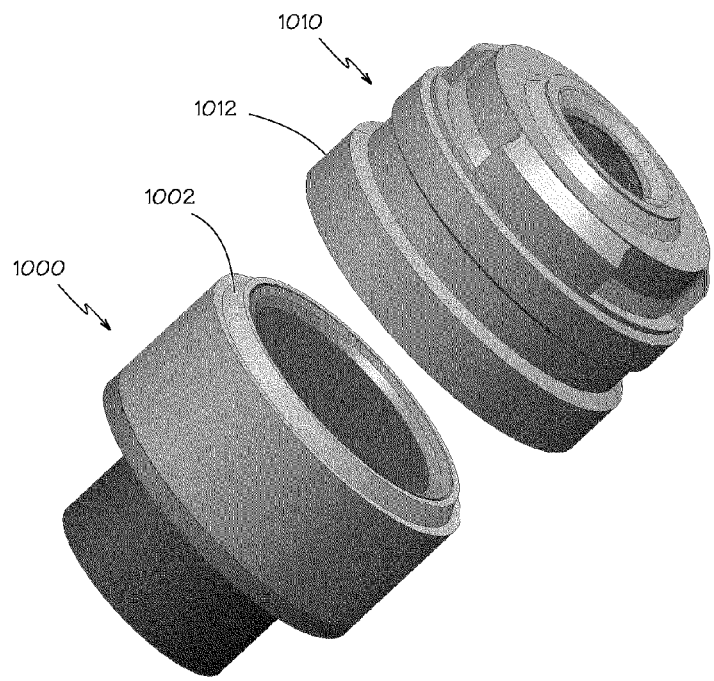
FIG. 10 is a pictorial view of another lens assembly with another tool for assembling the lens assembly to the lens moving mechanism.
Figure 11:
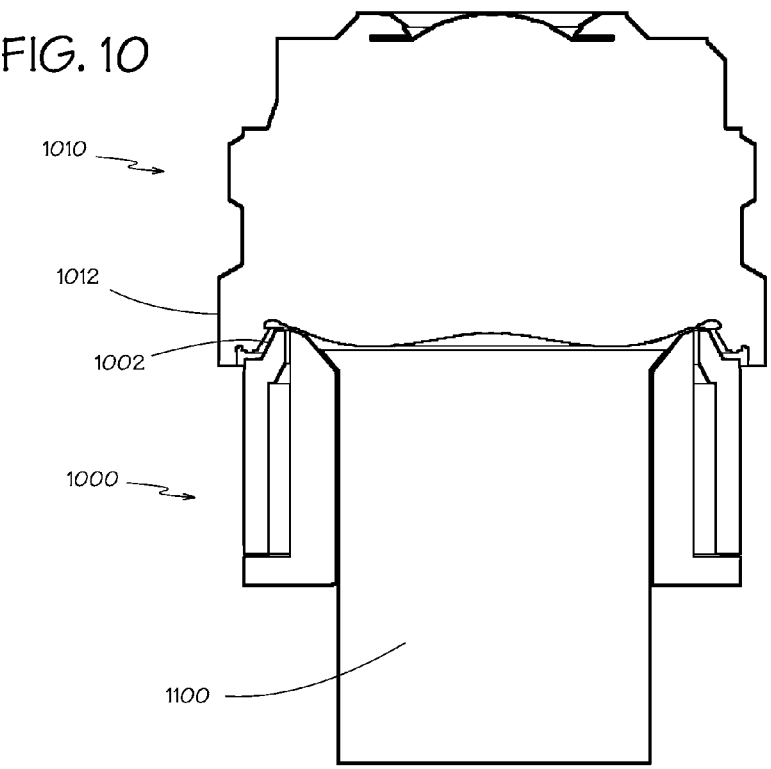
FIG. 11 is a cross-sectional view of the tool of FIG. 10 engaging the lens assembly.

FIG. 10 is a pictorial view of another lens assembly 1010 with another tool 1000 for assembling the lens assembly to the lens moving mechanism. FIG. 11 is a cross-sectional view of the tool 1000 of FIG. 10 engaging the lens assembly 1010. In this embodiment, the inside surface of the second cylindrical portion 1012 of the lens assembly 1010 provides a recess and the installation tool 1012 provides a gripping section 1002 that expands to press against the recess. As illustrated the gripping section 1002 may be conical to engage a corresponding conical recess. In other embodiments not illustrated, the recess may be cylindrical with a surface parallel to an optical axis of the lens assembly and the tool may provide a cylindrical gripping section.

As may be seen in FIG. 11, the gripping section 1002 of the installation tool 1000 may be mechanically expanded to press against the recess in the second cylindrical portion 1012 of the lens assembly 1010. For example, a plunger 1100 may be moved in an axial direction to expand the gripping section 1002 of the installation tool 1000.

In other embodiments, the gripping section of the installation tool may be pneumatically expanded to press against the recess in the second cylindrical portion 1012 of the lens assembly 1010.

In other embodiments, the gripping section of the installation tool may be hydraulically expanded to press against the recess in the second cylindrical portion 1012 of the lens assembly 1010.

The gripping section 1002 of the installation tool 1000 may be a resilient material. The gripping section 1002 of the installation tool 1000 may be a material having a high coefficient of static friction with the lens barrel material. For example, the coefficient of static friction may be greater than 0.6.

In other embodiments, a vacuum may be applied to hold the lens assembly 1010 with the installation tool 1000. The vacuum may cause the lens assembly 1010 to press against the gripping section 1002 of the installation tool 1000 and cause the gripping section to expand and press against the recess in the second cylindrical portion 1012 of the lens assembly.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A method of assembling a camera module, the method comprising:
    inserting a lens assembly into a lens moving mechanism, the lens assembly including a lens barrel having a first cylindrical portion that includes an externally threaded portion and a second cylindrical portion that has a larger diameter than the externally threaded portion;
    engaging an installation tool with the second cylindrical portion of the lens assembly, a portion of the installation tool that engages the lens assembly having a diameter no greater than the diameter of the second cylindrical portion of the lens assembly;
    rotating the lens assembly with the installation tool to engage the externally threaded portion of the lens assembly with an internally threaded portion of a movable sleeve in the lens moving mechanism; and
    coupling an image sensor to the lens moving mechanism such that the second cylindrical portion of the lens assembly is closest to the image sensor.

2. The method of claim 1 wherein the lens assembly includes at least two lenses, one lens being mounted in the second cylindrical portion of the lens assembly.

3. The method of claim 1 wherein the lens moving mechanism is a voice coil motor.

4. The method of claim 1 further comprising applying a vacuum to hold the lens assembly with the installation tool.

5. The method of claim 1 wherein the installation tool mechanically engages the second cylindrical portion of the lens assembly.

6. The method of claim 1 wherein a surface of the installation tool that engages the second cylindrical portion of the lens assembly is a material having a coefficient of static friction greater than 0.6.

7. The method of claim 1 wherein engaging the installation tool further comprises using a temporary adhesive to join the lens barrel to the installation tool.

8. The method of claim 7 further comprising separating the lens barrel from the installation tool at the adhesive joint.

9. The method of claim 1 wherein the installation tool engages an inside surface of the second cylindrical portion of the lens assembly.

10. The method of claim 9 wherein the inside surface of the second cylindrical portion of the lens assembly provides a conical recess and the installation tool provides a conical surface that presses against the conical recess.

11. The method of claim 10 wherein the conical surface of the installation tool is a material having a coefficient of static friction greater than 0.6.

12. The method of claim 9 wherein the inside surface of the second cylindrical portion of the lens assembly provides a cylindrical recess with a surface parallel to an optical axis of the lens assembly and the installation tool provides a gripping section that expands to press against the cylindrical recess.

13. The method of claim 12 wherein the gripping section of the installation tool is mechanically expanded to press against the cylindrical recess.

14. The method of claim 12 wherein the gripping section of the installation tool is pneumatically expanded to press against the cylindrical recess.

15. The method of claim 12 wherein the gripping section of the installation tool is hydraulically expanded to press against the cylindrical recess.

16. The method of claim 12 wherein the gripping section of the installation tool includes a material having a coefficient of static friction greater than 0.6.

17. The method of claim 12 further comprising applying a vacuum to hold the lens assembly with the installation tool, the vacuum causing the lens assembly to press against the gripping section of the installation tool and cause the gripping section to expand and press against the cylindrical recess.

18. A method of assembling a lens assembly and a lens moving mechanism, the method comprising:
    inserting the lens assembly into the lens moving mechanism, the lens assembly including a lens barrel having a first cylindrical portion that includes an externally threaded portion, a first lens mounted in the first cylindrical portion, a second cylindrical portion that has a larger diameter than the externally threaded portion, and a second lens mounted in the second cylindrical portion, the second lens being the lens that will be closest to an image sensor;

engaging an installation tool with the second cylindrical portion of the lens assembly, a portion of the installation tool that engages the lens assembly having a diameter no greater than the diameter of the second cylindrical portion of the lens assembly; and rotating the lens assembly with the installation tool to engage the externally threaded portion of the lens assembly with an internally threaded portion of a movable sleeve in the lens moving mechanism.

19. The method of claim 18 wherein the lens moving mechanism is a voice coil motor.

20. The method of claim 18 further comprising applying a vacuum to hold the lens assembly with the installation tool.

21. The method of claim 18 wherein the installation tool mechanically engages the second cylindrical portion of the lens assembly.

22. The method of claim 18 wherein a surface of the installation tool that engages the second cylindrical portion of the lens assembly is a material having a coefficient of static friction greater than 0.6.

23. The method of claim 18 wherein engaging the installation tool further comprises using a temporary adhesive to join the lens barrel to the installation tool.

24. The method of claim 23 further comprising separating the lens barrel from the installation tool at the adhesive joint.

25. The method of claim 18 wherein the installation tool engages an inside surface of the second cylindrical portion of the lens assembly.

26. The method of claim 25 wherein the inside surface of the second cylindrical portion of the lens assembly provides a conical recess and the installation tool provides a conical surface that presses against the conical recess.

27. The method of claim 26 wherein the conical surface of the installation tool is a material having a coefficient of static friction greater than 0.6.

28. The method of claim 25 wherein the inside surface of the second cylindrical portion of the lens assembly provides a cylindrical recess with a surface parallel to an optical axis of the lens assembly and the installation tool provides a gripping section that expands to press against the cylindrical recess.

29. The method of claim 28 wherein the gripping section of the installation tool is mechanically expanded to press against the cylindrical recess.

30. The method of claim 28 wherein the gripping section of the installation tool is pneumatically expanded to press against the cylindrical recess.

31. The method of claim 28 wherein the gripping section of the installation tool is hydraulically expanded to press against the cylindrical recess.

32. The method of claim 28 wherein the gripping section of the installation tool includes a material having a coefficient of static friction greater than 0.6.

33. The method of claim 28 further comprising applying a vacuum to hold the lens assembly with the installation tool, the vacuum causing the lens assembly to press against the gripping section of the installation tool and cause the gripping section to expand and press against the cylindrical recess.

* * * * *